United States Patent
Coyle et al.

(10) Patent No.: US 10,776,376 B1
(45) Date of Patent: Sep. 15, 2020

(54) SYSTEMS AND METHODS FOR DISPLAYING SEARCH RESULTS

(71) Applicant: Veritas Technologies LLC, Santa Clara, CA (US)

(72) Inventors: Michael Coyle, Los Altos, CA (US); Rujuta Ranade, Sunnyvale, CA (US); Terence Chang, San Francisco, CA (US)

(73) Assignee: Veritas Technologies LLC, Santa Clara, CA (US)

(*) Notice: Subject to any disclaimer, the term of this patent is extended or adjusted under 35 U.S.C. 154(b) by 757 days.

(21) Appl. No.: 14/562,038

(22) Filed: Dec. 5, 2014

(51) Int. Cl.
*G06F 16/248* (2019.01)
*G06F 16/93* (2019.01)

(52) U.S. Cl.
CPC ............ *G06F 16/248* (2019.01); *G06F 16/93* (2019.01)

(58) Field of Classification Search
None
See application file for complete search history.

(56) References Cited

U.S. PATENT DOCUMENTS

| | | | | |
|---|---|---|---|---|
| 4,454,576 A | * | 6/1984 | McInroy | G06F 40/174 715/201 |
| 5,065,347 A | * | 11/1991 | Pajak | G06F 16/168 715/835 |
| 5,504,889 A | * | 4/1996 | Burgess | G06F 16/93 |
| 5,515,487 A | * | 5/1996 | Beaudet | G06T 11/206 345/440 |
| 5,619,688 A | * | 4/1997 | Bosworth | G06F 16/2428 |
| 5,701,137 A | * | 12/1997 | Kiernan | G06F 9/451 715/853 |
| 5,704,028 A | * | 12/1997 | Schanel | G06F 3/04845 345/440 |
| 5,838,319 A | * | 11/1998 | Guzak | G06F 3/0481 715/854 |

(Continued)

OTHER PUBLICATIONS

Jennings, Roger. Microsoft Access 2010 In Depth, ISBN: 9780768695229, pp. 426-429, retrieved Aug. 3, 2017 from http://techbus.safaribooksonline.com/book/databases/microsoft-access/9780768695229.*

(Continued)

*Primary Examiner* — Mariela Reyes
*Assistant Examiner* — Edward Jacobs
(74) *Attorney, Agent, or Firm* — FisherBroyles, LLP

(57) ABSTRACT

The disclosed computer-implemented method for displaying search results may include (1) receiving a search query to search a document database that stores a document family containing a parent document and a child document that depends from the parent document, (2) determining that both the parent document and the child document satisfy a degree of relevance to content of the search query, and (3) in response to determining that both the parent document and the child document satisfy the degree of relevance to content of the search query, automatically depicting both the parent document and the child document in a hierarchical structure that shows the relationship between the parent document and the child document within original search results that a user interface of a computing device presents in response to the search query. Various other methods, systems, and computer-readable media are also disclosed.

17 Claims, 10 Drawing Sheets

(56) References Cited

U.S. PATENT DOCUMENTS

| | | | | |
|---|---|---|---|---|
| 5,917,492 | A * | 6/1999 | Bereiter | G06F 3/0489 715/799 |
| 5,953,017 | A * | 9/1999 | Beach | G06F 3/0481 345/440 |
| 5,963,935 | A * | 10/1999 | Ozbutun | G06F 16/24558 |
| 5,987,469 | A * | 11/1999 | Lewis | G06F 16/168 |
| 6,016,488 | A * | 1/2000 | Bosworth | G06F 16/2428 |
| 6,128,365 | A | 10/2000 | Bechwati | |
| 6,184,885 | B1 * | 2/2001 | DeStefano | G06F 16/94 715/804 |
| 6,226,641 | B1 * | 5/2001 | Hickson | G06F 21/6218 |
| 6,252,597 | B1 * | 6/2001 | Lokuge | G06F 3/0481 715/841 |
| 6,341,280 | B1 * | 1/2002 | Glass | G06F 16/10 707/754 |
| 6,437,812 | B1 * | 8/2002 | Giles | G06F 3/0481 715/853 |
| 6,732,086 | B2 * | 5/2004 | Plow | G06F 16/951 707/722 |
| 6,877,135 | B1 * | 4/2005 | Kamiwada | G06F 3/0482 707/999.003 |
| 6,948,125 | B2 * | 9/2005 | Detweiler | G06F 3/0482 715/713 |
| 6,961,731 | B2 * | 11/2005 | Holbrook | G06Q 40/04 |
| 7,174,346 | B1 * | 2/2007 | Gharachorloo | G06F 16/951 |
| 7,242,413 | B2 * | 7/2007 | Chu | G06F 9/451 345/619 |
| 7,266,783 | B2 * | 9/2007 | Fujita | G06F 3/04815 715/848 |
| 7,299,222 | B1 * | 11/2007 | Hogan | G06F 16/248 |
| 7,360,175 | B2 * | 4/2008 | Gardner | G06F 3/0482 715/825 |
| 7,519,923 | B2 * | 4/2009 | Peterson | G06F 3/0482 715/853 |
| 7,571,177 | B2 * | 8/2009 | Damle | G06F 40/30 |
| 7,716,582 | B2 * | 5/2010 | Mueller | G06F 3/0482 701/533 |
| 7,984,388 | B2 * | 7/2011 | Dieberger | G06F 3/0482 707/797 |
| 7,992,102 | B1 * | 8/2011 | De Angelo | G06F 3/0482 715/804 |
| 8,046,370 | B2 * | 10/2011 | Wen | G06F 16/338 707/748 |
| 8,166,402 | B2 * | 4/2012 | Collins | G06F 40/166 715/732 |
| 8,176,041 | B1 * | 5/2012 | Harinarayan | G06F 16/3325 707/722 |
| 8,375,335 | B2 * | 2/2013 | Wong | G06F 8/60 715/853 |
| 8,620,842 | B1 | 12/2013 | Cormack | |
| 8,669,982 | B2 * | 3/2014 | Breeds | G06T 11/206 345/440 |
| 8,694,526 | B2 * | 4/2014 | Costello | G06Q 30/02 707/765 |
| 8,713,063 | B2 * | 4/2014 | Abrams | G06F 16/9027 707/797 |
| 8,971,644 | B1 * | 3/2015 | Jing | G06K 9/726 382/224 |
| 9,129,036 | B2 * | 9/2015 | Dexter | G06F 16/8373 |
| 9,229,610 | B2 * | 1/2016 | Lu | G06F 16/26 |
| 9,507,811 | B2 * | 11/2016 | Makela | G06F 16/22 |
| 10,002,310 | B2 * | 6/2018 | Gopalan | G06F 16/51 |
| 2002/0152222 | A1 * | 10/2002 | Holbrook | G06F 16/338 |
| 2003/0145041 | A1 * | 7/2003 | Dunham | H04L 63/102 709/203 |
| 2003/0214538 | A1 * | 11/2003 | Farrington | G06F 16/904 715/854 |
| 2004/0093328 | A1 * | 5/2004 | Damle | G06F 16/345 |
| 2004/0210567 | A1 * | 10/2004 | Bourdoncle | G06F 16/951 |
| 2004/0249782 | A1 * | 12/2004 | Ricci | G06F 16/2237 |
| 2004/0268219 | A1 * | 12/2004 | Brown | G06F 8/36 715/205 |
| 2005/0033773 | A1 * | 2/2005 | Roberge | G10L 15/26 |
| 2005/0050459 | A1 * | 3/2005 | Qu | G06F 40/14 715/234 |
| 2005/0055438 | A1 * | 3/2005 | Matti | G06F 40/174 709/224 |
| 2005/0120005 | A1 * | 6/2005 | Tesch | G06F 16/9038 |
| 2006/0020591 | A1 * | 1/2006 | Kommers | G06F 16/90324 |
| 2006/0059144 | A1 * | 3/2006 | Canright | G06F 16/382 |
| 2006/0064428 | A1 * | 3/2006 | Colaco | G06F 16/86 |
| 2006/0080314 | A1 * | 4/2006 | Hubert | G06F 16/93 |
| 2006/0103534 | A1 | 5/2006 | Arms | |
| 2006/0149710 | A1 | 7/2006 | Koningstein | |
| 2006/0155746 | A1 * | 7/2006 | Abrams | G06F 16/9027 |
| 2006/0161535 | A1 * | 7/2006 | Holbrook | G06F 16/338 |
| 2007/0162448 | A1 * | 7/2007 | Jain | G06F 16/334 |
| 2008/0040505 | A1 * | 2/2008 | Britto | G06F 3/067 709/238 |
| 2008/0091404 | A1 | 4/2008 | Perrella | |
| 2008/0235210 | A1 * | 9/2008 | Krishnaprasad | G06F 16/93 |
| 2008/0288886 | A1 * | 11/2008 | Sherwood | G06F 16/9024 715/772 |
| 2009/0012956 | A1 * | 1/2009 | Wen | G06F 16/951 |
| 2009/0070301 | A1 * | 3/2009 | McLean | G06F 16/30 |
| 2009/0216738 | A1 * | 8/2009 | Dexter | G06F 16/8373 |
| 2009/0271379 | A1 * | 10/2009 | Bakalash | G06F 16/30 |
| 2010/0070484 | A1 * | 3/2010 | Kraft | G06F 16/951 707/706 |
| 2010/0257177 | A1 * | 10/2010 | Yamamoto | G06F 16/30 707/741 |
| 2010/0309196 | A1 * | 12/2010 | Castleman | G06T 13/80 345/418 |
| 2011/0106811 | A1 * | 5/2011 | Novoselsky | G06F 16/81 707/741 |
| 2011/0113385 | A1 * | 5/2011 | Sayers | G06F 16/954 715/853 |
| 2012/0294540 | A1 * | 11/2012 | Sun | G06F 16/24578 382/225 |
| 2013/0013596 | A1 | 1/2013 | Wang | |
| 2013/0054643 | A1 * | 2/2013 | Yao | G06F 40/14 707/770 |
| 2013/0282719 | A1 * | 10/2013 | Graefe | G06F 16/27 707/736 |
| 2013/0339347 | A1 * | 12/2013 | Hogan | G06F 16/9535 707/722 |
| 2014/0096088 | A1 * | 4/2014 | Lu | G06F 16/26 715/853 |
| 2014/0193039 | A1 | 7/2014 | Wexler | |
| 2014/0244624 | A1 * | 8/2014 | Isaacson | G06F 16/285 707/722 |
| 2015/0016712 | A1 | 1/2015 | Rhoads | |
| 2015/0032748 | A1 * | 1/2015 | Kikuchi | G06F 16/316 707/737 |
| 2015/0081712 | A1 * | 3/2015 | Shah | G06F 16/56 707/737 |
| 2015/0169635 | A1 * | 6/2015 | Jing | G06F 16/50 707/723 |
| 2015/0172843 | A1 | 6/2015 | Quan | |
| 2015/0213463 | A1 * | 7/2015 | Turner | G06F 16/24542 705/7.33 |
| 2015/0302094 | A1 * | 10/2015 | Bobick | G06F 16/24575 707/706 |
| 2015/0302633 | A1 * | 10/2015 | Li | G09G 5/14 345/419 |
| 2015/0310309 | A1 * | 10/2015 | Gopalan | G06K 9/46 382/199 |
| 2016/0147808 | A1 * | 5/2016 | Schreter | G06F 16/319 707/696 |

OTHER PUBLICATIONS

"Search returns results that do not match some required keywords", http://community.ebay.com/t5/Search/Search-returns-results-that-do-not-match-some-required-keywords/td-p/2993976, as accessed Feb. 5, 2014, The eBay Community, (Feb. 26, 2013).

"Relativity", http://kcura.com/relativity/, as accessed Feb. 5, 2014, kCura, (Aug. 26, 2009).

(56) References Cited

OTHER PUBLICATIONS

Michael Coyle, et al.; Systems and Methods for Expanding Search Results; U.S. Appl. No. 14/229,119, filed Mar. 28, 2014.
Michael Coyle, et al; Systems and Methods for Expanding Search Results; U.S. Appl. No. 14/229,398, filed Mar. 28, 2014.
Michael Coyle, et al; Systems and Methods for Displaying Search Results; U.S. Appl. No. 14/506,300, filed Oct. 3, 2014.
"Autonomy eDiscovery", http://www.ndm.net/archiving/HP-Autonomy/autonomy-ediscovery, as accessed Oct. 9, 2014, (Nov. 12, 2012).
"Nuix", http://www.nuix.com/, as accessed Oct. 9, 2014, (Jan. 7, 2007).
"Data structure", http://en.wikipedia.org/wiki/Data_structure, as accessed Oct. 9, 2014, (Dec. 4, 2003).
"eDiscovery", http://www.autonomy.com/offerings/ediscovery/, as accessed Aug. 28, 2014, Hewlett-Packard Development Company. L.P., (Sep. 22, 2013).
"Enterprise eDiscovery", http://www.nuix.com/enterprise-ediscovery, as accessed Aug. 28, 2014, Nuix, (Oct. 7, 2013).
"Identity provider", http://en.wikipedia.org/wiki/Identity_provider, as accessed Aug. 28, 2014, Wikipedia, (Mar. 15, 2012).
"What does value & 0xff do in Java?", http://stackoverflow.com/questions/11380062/what-does-value-0xff-do-in-java, as accessed Aug. 28, 2014, (Jul. 8, 2012).

\* cited by examiner

SYSTEMS AND METHODS FOR DISPLAYING SEARCH RESULTS

BACKGROUND

When a user performs a search for documents within a database, a search engine may analyze and filter the documents within the database to provide the most relevant results. Some documents returned to the user may be part of a family of related documents, such as a file embedded within another file or an email with corresponding email attachments. For example, in an e-discovery platform, users may search a document database for documents related to a specific search query. In response, the e-discovery platform may return one or more members of a document family that are related to the search query.

Traditional methods for providing the results of a document search to a user may include listing or displaying each document that corresponds to a set of search criteria. For example, a search engine may list documents in an order corresponding to their relevance to the search criteria. Unfortunately, such conventional methods for displaying search results may not provide users with important and/or helpful associations between groups of related documents. For example, even if a database stores associations between documents in document families, traditional search engines may request that users provide additional input (e.g., after the original search results are displayed) in order to view documents organized based on their relationships with one another. Accordingly, the current disclosure identifies a need for improved methods for displaying search results.

SUMMARY

As will be described in greater detail below, the instant disclosure describes various systems and methods for displaying search results by, for example, determining that both a parent document and a child document that depends from the parent document satisfy a degree of relevance to content of a search query. The parent document and the child document may then be automatically presented in a hierarchical structure within a user interface that displays original search results of the search query.

In one example, a computer-implemented method for displaying search results may include (1) receiving a search query to search a document database that stores a document family containing a parent document and a child document that depends from the parent document, (2) determining that both the parent document and the child document satisfy a degree of relevance to content of the search query, and (3) in response to determining that both the parent document and the child document satisfy the degree of relevance to content of the search query, automatically depicting both the parent document and the child document in a hierarchical structure that shows the relationship between the parent document and the child document within original search results that a user interface of a computing device presents in response to the search query. In some embodiments, automatically depicting both the parent document and the child document in the hierarchical structure may be performed in response to the search query without requiring further user input to expand the original search results.

In some examples, determining that both the parent document and the child document satisfy the degree of relevance may include determining whether the document family is completely included within the original search results. In these examples, determining whether the document family is completely included within the original search results may include determining whether every document within the document family satisfies the degree of relevance.

In some embodiments, determining whether every document within the document family satisfies the degree of relevance may include generating a data structure that identifies a parent document for each document family that contains at least one document that satisfies the degree of relevance. In such embodiments, generating the data structure may include performing the following function for each document that satisfies the degree of relevance: (1) determining whether to add the document to the data structure based on determining whether the document database identifies the document as a parent document and (2) adding any parent document of the document to the data structure.

In some examples, determining whether every document within the document family satisfies the degree of relevance may further include identifying the complete document family for each document that satisfies the degree of relevance by referencing a cache that maps parent documents to child documents. In these examples, referencing the cache that maps parent documents to child documents may include identifying each child document of every parent document identified in the data structure.

In some embodiments, determining whether every document within the document family satisfies the degree of relevance may further include searching for every child document of the document family identified within the cache that maps parent documents to child documents within another data structure that identifies all documents that satisfy the degree of relevance. In such embodiments, the method may then include determining whether to mark the document family as completely included within the original search results based on whether every child document of the document family is found within the other data structure that identifies all documents that satisfy the degree of relevance. In some examples, the method may further include generating a data map that identifies a parent document for every document family that is completely included within the original search results.

In some embodiments, the method may include determining that the document family is not completely included within the original search results. In such embodiments, the method may include omitting a member of the document family from the depiction of the hierarchical structure. In other embodiments, the method may include determining that the document family is completely included within the original search results. In such embodiments, the method may include displaying the entirety of the document family within the depiction of the hierarchical structure.

In one embodiment, a system for implementing the above-described method may include (1) a reception module that receives a search query to search a document database that stores a document family containing a parent document and a child document that depends from the parent document, (2) a determination module that determines that both the parent document and the child document satisfy a degree of relevance to content of the search query, and (3) a depiction module that automatically depicts, in response to the determination that both the parent document and the child document satisfy the degree of relevance to content of the search query, both the parent document and the child document in a hierarchical structure that shows the relationship between the parent document and the child document within original search results that a user interface of a computing device presents in response to the search query. In addition, the system may include at least one processor that executes the reception module, the determination module, and the depiction module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive a search query to search a document database that stores a document family containing a parent document and a child document that depends from the parent document, (2) determine that both the parent document and the child document satisfy a degree of relevance to content of the search query, and (3) in response to determining that both the parent document and the child document satisfy the degree of relevance to content of the search query, automatically depict both the parent document and the child document in a hierarchical structure that shows the relationship between the parent document and the child document within original search results that a user interface of a computing device presents in response to the search query.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
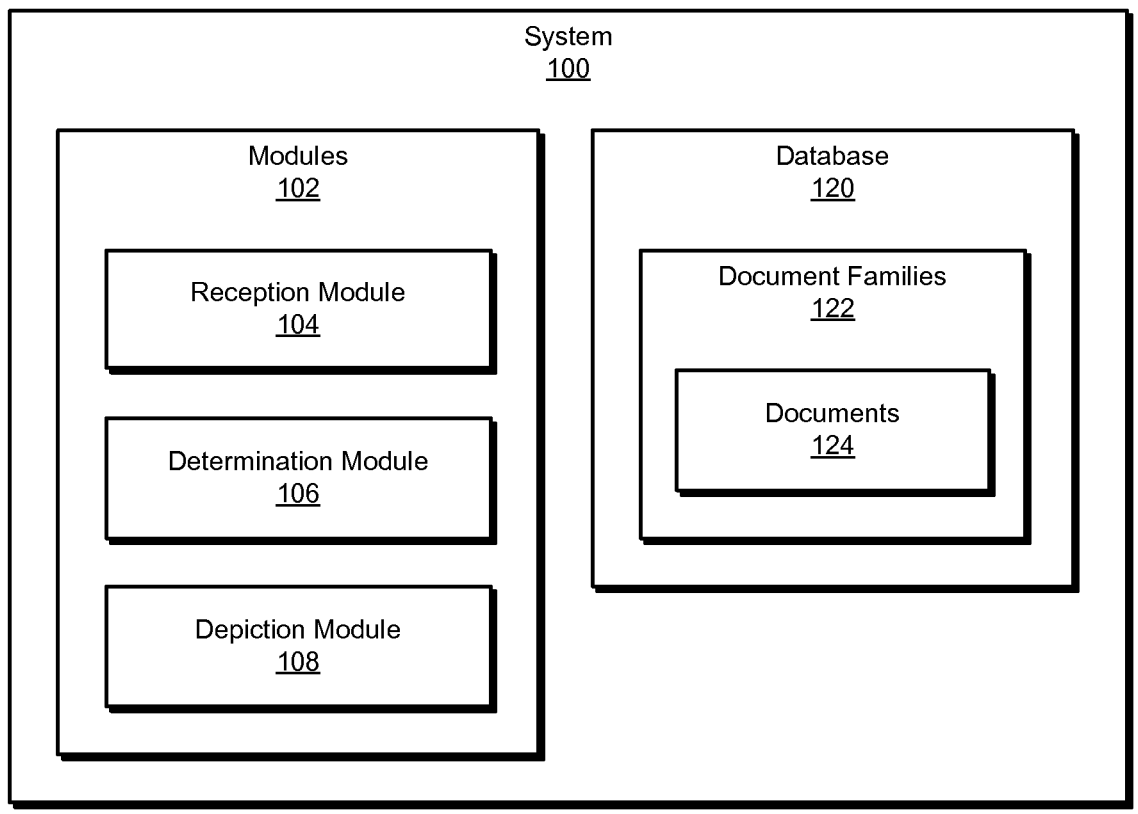
FIG. 1 is a block diagram of an exemplary system for displaying search results.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for displaying search results. As will be explained in greater detail below, by determining that each member of a document family satisfies a degree of relevance to content of a search query, the disclosed systems and methods may determine whether the document family is completely included within the results of the search query. In addition, by identifying each complete document family within the results of a search query, the disclosed systems and methods may automatically depict each complete document family to a user without requiring additional input from the user. As such, the disclosed systems and methods may quickly and efficiently provide users with an intuitive, hierarchical display that clearly and accurately describes the relationships between documents within results of a search query.

Figure 2:
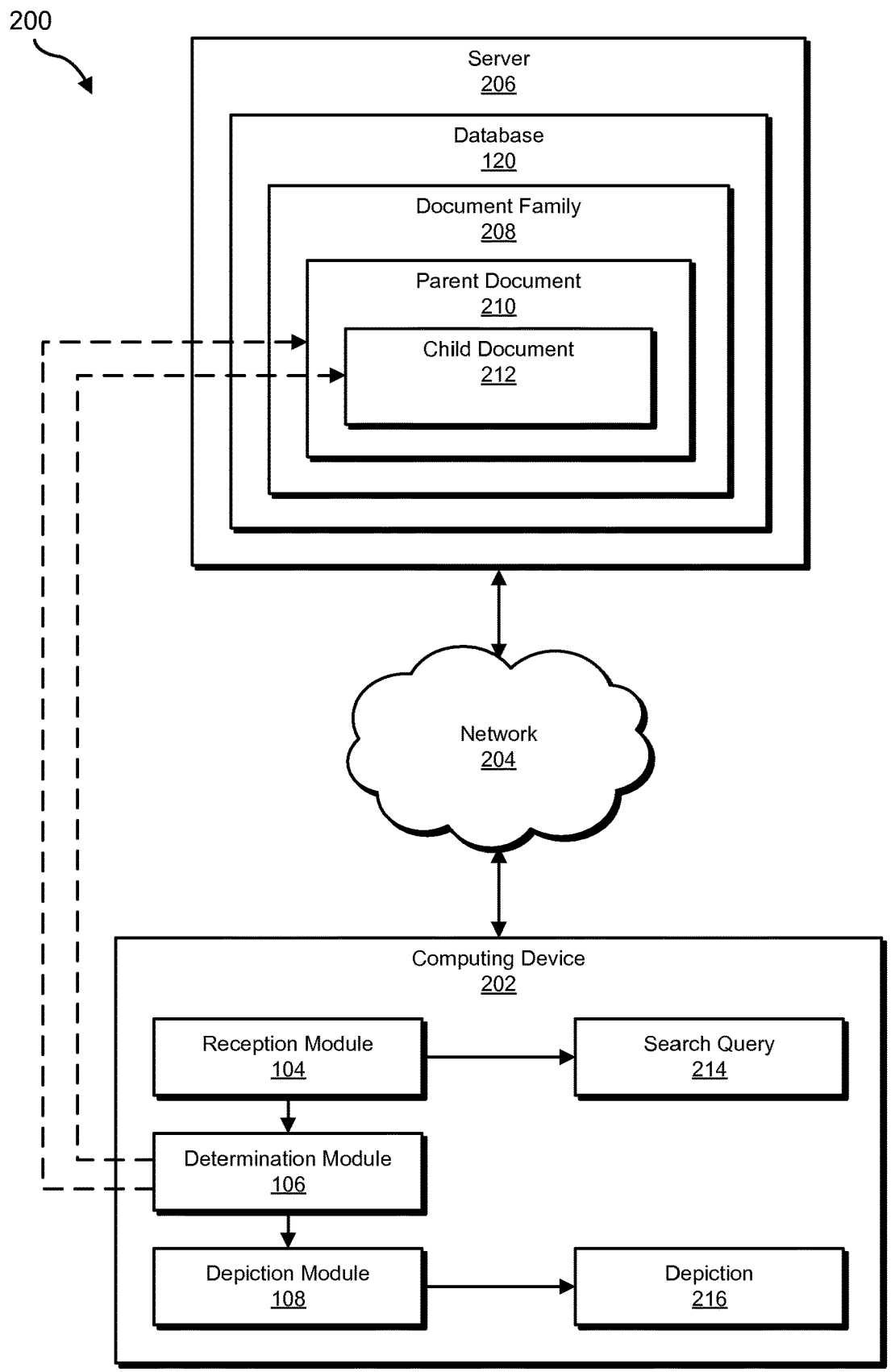
FIG. 2 is a block diagram of an additional exemplary system for displaying search results.

The following will provide, with reference to FIGS. 1 and 2, detailed descriptions of exemplary systems for displaying search results. Detailed descriptions of corresponding computer-implemented methods will also be provided in connection with FIGS. 3-8. In addition, detailed descriptions of an exemplary computing system and network architecture capable of implementing one or more of the embodiments described herein will be provided in connection with FIGS. 9 and 10, respectively.

FIG. 1 is a block diagram of an exemplary system 100 for displaying search results. As illustrated in this figure, exemplary system 100 may include one or more modules 102 for performing one or more tasks. For example, and as will be explained in greater detail below, exemplary system 100 may include a reception module 104 that receives a search query to search a document database that stores a document family containing a parent document and a child document that depends from the parent document. Exemplary system 100 may also include a determination module 106 that determines that both the parent document and the child document satisfy a degree of relevance to content of the search query.

In addition, and as will be described in greater detail below, exemplary system 100 may include a depiction module 108 that automatically depicts, in response to determining that both the parent document and the child document satisfy the degree of relevance to content of the search query, both the parent document and the child document in a hierarchical structure that shows the relationship between the parent document and the child document within original search results that a user interface of a computing device presents in response to the search query. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 910 in FIG. 9, and/or portions of exemplary network architecture 1000 in FIG. 10. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store document families 122. In some examples, each of document families 122 may contain one or more of documents 124, which may also be stored in database 120. In general, database 120 may be configured to store any collection of document families and/or independent documents that may be analyzed and displayed to a user in response to the user performing a search.

The term "document family," as used herein, generally refers to any group of files, messages, and/or stored data that are related to and/or associated with one another. In some examples, a document family may include a parent document and one or more child documents. As used herein, a "parent document" may represent the top level (or relatively higher level) of a document family that is organized in a hierarchy. In some examples, a parent document may contain, include, or otherwise be associated with one or more child documents that represent lower levels of the hierarchy. In these examples, a child document may depend from a parent document. As used herein, a document that "depends from" another document generally refers to any document that is attached to another document (via, e.g., email attachment), embedded within another document (e.g., content embedded within a parent document), and/or referenced by another document. For example, a document family may include an email (the parent document) and attachments (the child documents) distributed via the email. In another example, a document family may include a file (the parent document) and any files (the child documents) embedded within the file. Moreover, as used herein, the term "document" generally refers to any file or data unit that contains readable text for document review purposes, including emails and other readable documents.

In addition, database 120 and/or documents 124 may store information that indicates the child or parent status of each document, as well as information that identifies any child and/or parent documents associated with each document. Furthermore, in exemplary embodiments, the disclosed systems and methods may operate in the context of a document review and/or e-discovery platform that enables users to search for documents within document families.

Database 120 may represent portions of a single database or computing device or a plurality of databases or computing devices. For example, database 120 may represent a portion of server 206 in FIG. 2, computing system 910 in FIG. 9, and/or portions of exemplary network architecture 1000 in FIG. 10. Alternatively, database 120 in FIG. 1 may represent one or more physically separate devices capable of being accessed by a computing device, such as server 206 in FIG. 2, computing system 910 in FIG. 9, and/or portions of exemplary network architecture 1000 in FIG. 10.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In the example of FIG. 2, modules 102 may reside client-side on computing device 202 in order to facilitate a user of computing device 202 searching for documents within database 120. In this example, database 120 may reside server-side on server 206. In other examples, however, all or a part of modules 102 may reside server-side. Similarly, both server 206 and computing device 202 may be merged into a single machine or computing system.

In one embodiment, one or more of modules 102 from FIG. 1 may, when executed by at least one processor of computing device 202 and/or server 206, enable computing device 202 and/or server 206 to display search results. For example, and as will be described in greater detail below, one or more of modules 102 may cause computing device 202 and/or server 206 to receive a search query (e.g., search query 214) to search a document database (e.g., database 120) that stores a document family (e.g., document family 208) that contains a parent document (e.g., parent document 210) and a child document (e.g., child document 212) that depends from parent document 210. Next, one or more of modules 102 may cause computing device 202 and/or server 206 to determine that both parent document 210 and child document 212 satisfy a degree of relevance to content of search query 214. Finally, in response to the determination that both parent document 210 and child document 212 satisfy the degree of relevance to content of search query 214, one or more of modules 102 may cause computing device 202 and/or server 206 to automatically depict (within, e.g., a depiction 216) both parent document 210 and child document 212 in a hierarchical structure that shows the relationship between parent document 210 and child document 212 within original search results that a user interface of a computing device (e.g., computing device 202) presents in response to search query 214.

In the example of FIG. 2, a user may initiate search query 214 for documents within database 120. In some embodiments, the results of search query 214 may include all or a portion of document family 208 (e.g., including parent document 210 and child document 212). In such embodiments, identifying the search results may include determining that both parent document 210 and child document 212 satisfy a degree of relevance to content of search query 214. In response to determining that both parent document 210 and child document satisfy the degree of relevance, both documents may be automatically depicted in a hierarchical structure that illustrates their relationship within a user interface that presents original search results of search query 214.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 910 in FIG. 9, or any other suitable computing device.

Server 206 generally represents any type or form of computing device that is capable of storing, processing, managing, producing, and/or displaying search results. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 1000 in FIG. 10, or the like. Network 204 may facilitate communication or data transfer using wireless or wired connections. In one embodiment, network 204 may facilitate communication between computing device 202 and server 206.

Figure 3:
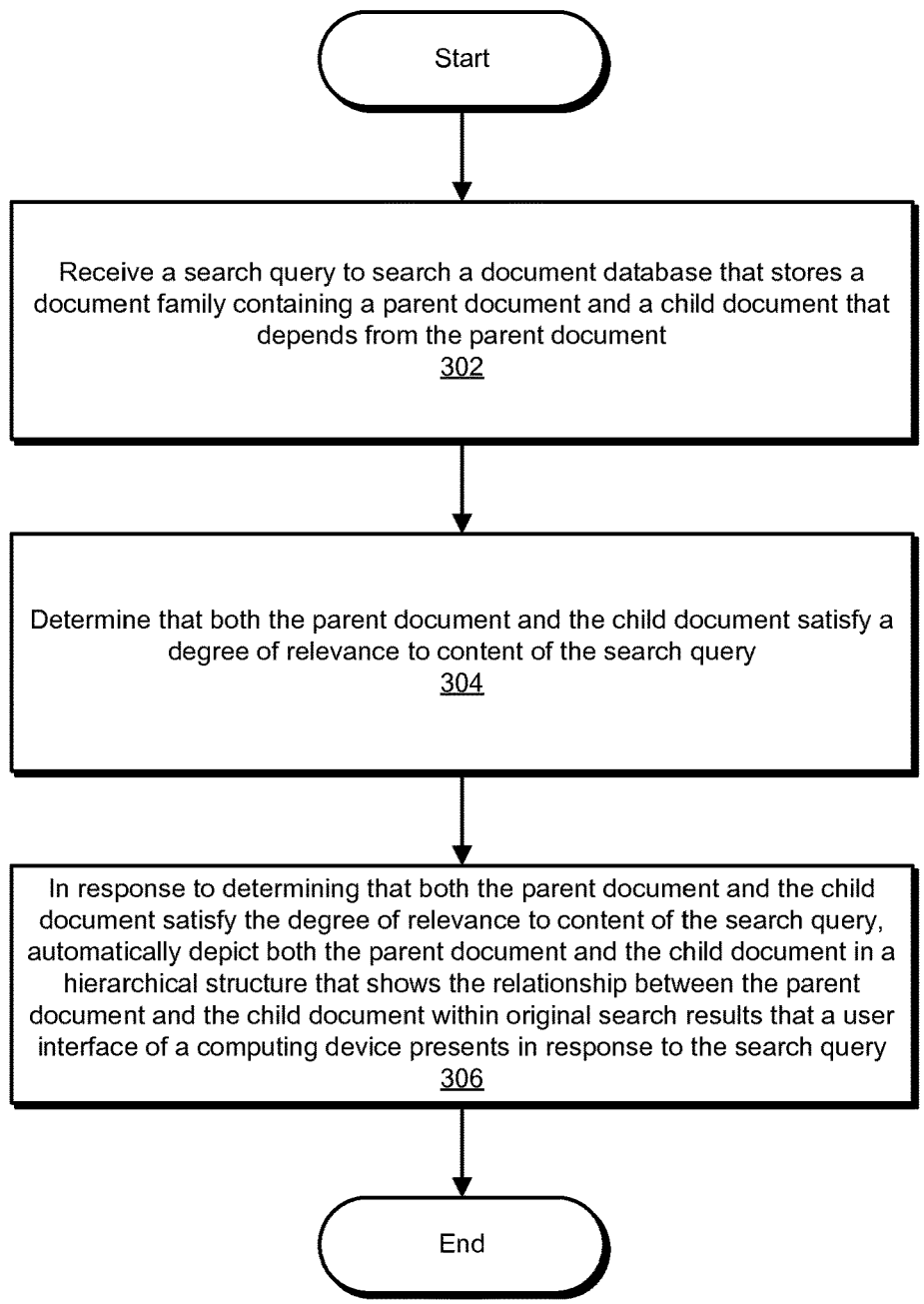
FIG. 3 is a flow diagram of an exemplary method for displaying search results.

FIG. 3 is a flow diagram of an exemplary computer-implemented method 300 for displaying search results. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 910 in FIG. 9, and/or portions of exemplary network architecture 1000 in FIG. 10.

As illustrated in FIG. 3, at step 302 one or more of the systems described herein may receive a query to search a document database that stores a document family containing a parent document and a child document that depends from the parent document. For example, reception module 104 may, as part of computing device 202 in FIG. 2, receive search query 214 that contains a request to search database 120 that stores document family 208 containing parent document 210 and child document 212 that depends from parent document 210.

The systems described herein may receive a query to search a document database in a variety of ways. In some examples, reception module 104 may receive search query 214 at computing device 202. For example, reception module 104 may determine that a user or other entity associated with computing device 202 has initiated search query 214 at computing device 202. Specifically, reception module 104 may determine that a user has directed, via a user interface displayed on computing device 202, a search engine to search database 120 for documents matching a particular set of criteria. Additionally or alternatively, reception module 104 may identify search query 214 at server 206. For example, reception module 104 may identify search query 214 as search query 214 is received by database 120 and/or while search query 214 is completed within database 120.

Returning to FIG. 3, at step 304 one or more of the systems described herein may determine that both the parent document and the child document satisfy a degree of relevance to content of the search query. For example, determination module 106 may, as part of computing device 202 in FIG. 2, determine that both parent document 210 and child document 212 satisfy a degree of relevance to content of search query 214.

The term "content of a search query," as used herein, generally refers to any type or form of criteria, characteristic, or limitation that a search engine may use to filter documents within a document database. In some examples, the content of a search query may be specified or entered by a user wishing to perform the search query. In one example, the content of a search query may include key words or terms (e.g., "financial report," "pictures of cats," etc.). In this example, a search engine may return documents based on the frequency with which the key words appear in the documents. The content of a search query may also include additional criteria used to filter documents, such as an author and/or origin of the documents, a date the documents were created, relationships between documents (e.g., child or parent documents), etc. Moreover, a user may specify the content of a search query in a variety of ways, such as by typing key words into a search bar or checking one or more boxes corresponding to certain criteria.

In addition, the term "degree of relevance," as used herein, generally refers to any type or form of measurement of whether and/or how much a document satisfies or matches a search query (e.g., quantifies the degree to which a document corresponds to or is related to the content of a search query). In some examples, a search engine may calculate and/or assign a degree of relevance to each document within a database in response to receiving a search query. In these examples, the degree of relevance assigned to each document may be normalized (i.e., the degree of relevance of one document may indicate the relevancy of the document compared to other documents in the database). In one embodiment, a degree of relevance may be represented by a numerical score (e.g., between 0 and 1, between 1 and 100, etc.) In another embodiment, a degree of relevance may simply be a binary classification (e.g., relevant or not relevant). A search engine may compare any number or combination of characteristics of a search query with documents within a database in order to determine degrees of relevance for the documents within the database. Similarly, a degree of relevance may be calculated using any one or combination of algorithms, such as a term frequency-inverse document frequency statistic, a cosine similarity measure, a PAGERANK algorithm, a vector space model, and/or any additional measurement of similarity or relevance.

In response to search query 214, determination module 106 and/or a search engine managed by determination module 106 may identify the results of search query 214. For example, determination module 106 may calculate a degree of relevance for all or a portion of documents 124 within database 120 (e.g., including parent document 210 and child document 212). Determination module 106 may then identify documents that satisfy a predetermined degree of relevance to content of search query 214. For example, determination module 106 may determine that documents with a degree of relevance over a certain threshold (e.g., above a certain numerical score or percentile) satisfy the degree of relevance to search query 214.

Determination module 106 may determine that both parent document 210 and child document 212 satisfy the degree of relevance in a variety of ways. In some examples, determination module 106 may determine whether both parent document 210 and child document 212 satisfy the degree of relevance by determining whether document family 208 is completely included within the original search results. For example, determination module 106 may determine whether every document within document family 208 (including any documents besides parent document 210 and child document 212) satisfies the degree of relevance.

In some embodiments, determination module 106 may determine whether document family 208 is completely included within the original search results by identifying every complete document family within the search results (e.g., every document family whose documents all satisfy the degree of relevance). Determination module 106 may identify every complete document family by generating one or more data structures that identify or represent subsets of documents within database 120.

In an exemplary embodiment, determination module 106 may generate one or more data maps that identify subsets of documents within database 120. The term "data map," as used herein, generally refers to any digital representation of discrete sets of information, where different locations (e.g., offsets) within the data map correspond to different ones of the discrete sets of information. For example, a data map may be used to store the pixel values of each pixel within an image. In addition, a data map may represent documents (such as one or more of documents 124) that are displayed to a user as the results of a search. Notably, bitmaps may represent each piece of information with a single bit, although data maps may represent each piece of information with any number of bits. Moreover, the term "data map," as used herein, need not assign the same number of bits to each document and/or need not assign a document to every bit or section of the data map. Furthermore, a data map may record multiple properties for a single document (e.g., using multiple bits), and not just the property of existence or presence (i.e., within search results, as discussed below).

Determination module 106 may generate a data map by representing each document within database 120 at a particular offset within the data map. For example, in order to create the data map, determination module 106 may first identify and/or extract a unique identifier associated with each document to be represented on the data map. In some embodiments, these unique identifiers may be stored in database 120 and/or in any other suitable data structure. After identifying each unique identifier, determination module 106 may convert each unique identifier to a corresponding offset within the data map.

In some examples, the data map may be a bitmap (e.g., the data map may store a single bit at each offset corresponding to a document). In these examples, determination module 106 may represent each document within the data map by toggling the bit at the corresponding offset on the data map. For example, each document may be represented by a binary logical high (i.e., "1") or a binary logical low (i.e., "0"). Generally, determination module 106 may update any number of bits stored at the corresponding offset on the data map in order to indicate that the document should be represented within the data map.

Figure 4:
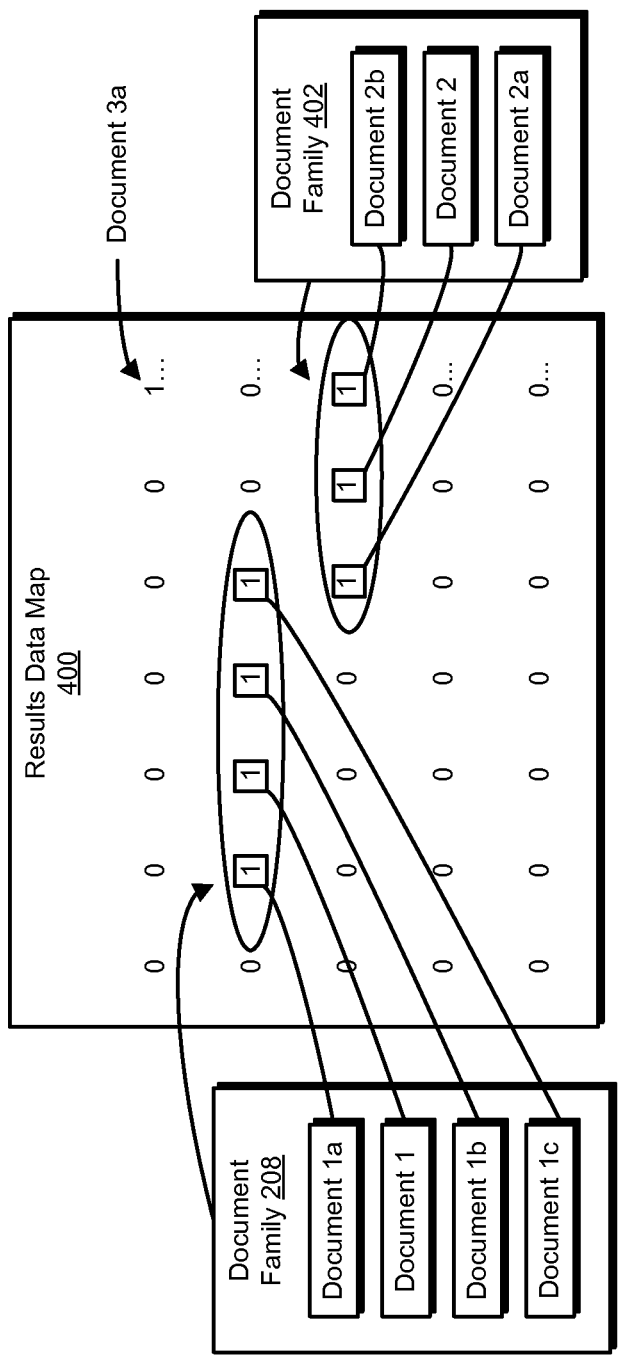
FIG. 4 is an illustration of an exemplary data map that identifies each document that satisfies a degree of relevance to a search query.

In some examples, determination module 106 may determine whether document family 208 is completely included within the original search results of search query 214 by generating a data structure (e.g., a bitmap) that identifies each document that satisfies the degree of relevance. As an example, FIG. 4 illustrates a results data map 400. Determination module 106 may generate results data map 400 at any point while or after a search engine identifies each document within database 120 that satisfies the degree of relevance to content of search query 214. As shown in FIG. 4, results data map 400 may indicate (via a "1" at corresponding locations) that document 1, document 1a, document 1b, and document 1c satisfy the degree of relevance. In this example, documents 1, 1a, 1b, and 1c may represent each document within document family 208. In addition, results data map 400 may indicate that each document within a document family 402 (i.e., document 2, document 2a, and document 2b) satisfy the degree of relevance. Finally, results data map 400 may indicate that document 3a satisfies the degree of relevance. In this example, document 3a may represent a child document whose parent document does not satisfy the degree of relevance. In additional examples, results data map 400 may include any number or combination of child and/or parent documents.

Figure 5:
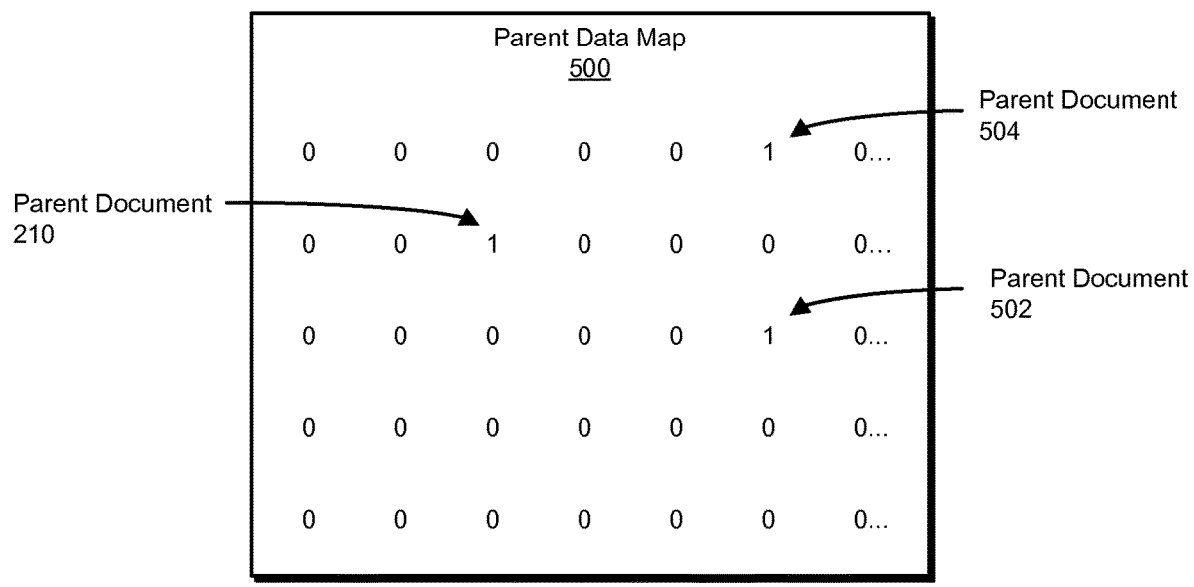
FIG. 5 is an illustration of an exemplary data map that identifies the parent document of any document family that is at least partially included within the results of a search query.

In some examples, determination module 106 may generate an additional data map that identifies a parent document for each document family that contains at least one document that satisfies the degree of relevance. As an example, FIG. 5 illustrates a parent data map 500. Determination module 106 may generate parent data map 500 at any point before, during, or after generating results data map 400. For example, after identifying a document that satisfies the degree of relevance, determination module 106 may determine whether to add the document to parent data map 500 based on determining whether database 120 identifies the document as a parent document. As previously mentioned, database 120 may store information that indicates the parent or child status of each document, as well as information that identifies any child and/or parent documents associated with each document. If determination module 106 determines that a document that satisfies the degree of relevance is a parent document based on the information that indicates the parent or child status of the document, determination module 106 may add a representation of the document to parent data map 500.

In other examples, if determination module 106 determines that the document is a child document, determination module 106 may identify information associated with the document that indicates the parent document of the document. Determination module 106 may then add a representation of the parent document to parent data map 500. Determination module 106 may similarly add a representation of the parent (if any) of that parent document to parent data map 500 (e.g., traversing up a chain of parent/child relationships), and so on. In this way, determination module 106 may ensure that every document family that contains at least one document that satisfies the degree of relevance is represented within parent data map 500.

As shown in FIG. 5, parent data map 500 may identify three parent documents (i.e., parent document 210, a parent document 502, and a parent document 504) that represent the parent documents of document families that contain at least one document that satisfies the degree of relevance. In this example, parent document 210 may represent document 1 identified within results data map 400. In addition, parent document 502 may represent document 2 identified within results data map 400. Finally, parent document 504 may represent the parent document of document 3a identified within results data map 400.

After generating parent data map 500, determination module 106 may continue to determine whether every document within document family 208 satisfies the degree of relevance by identifying the complete document family for each document that satisfies the degree of relevance. For example, determination module 106 may identify each complete document family by referencing a cache that maps parent documents to child documents. Specifically, determination module 106 may search the cache to identify each child document of every parent document identified within parent data map 500.

Figure 6:
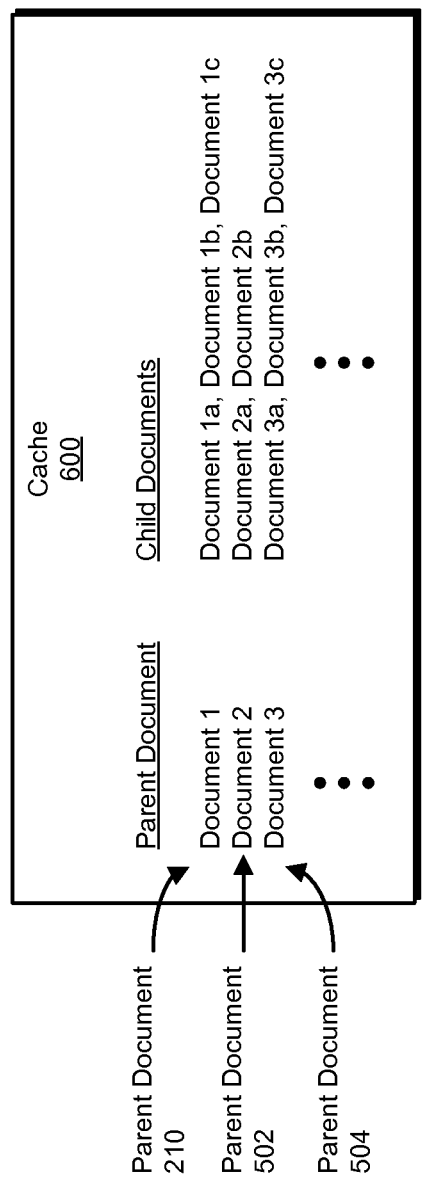
FIG. 6 is an illustration of an exemplary cache that maps parent documents to child documents.

As an example, FIG. 6 illustrates a cache 600 that maps parent documents to child documents. In this example, cache 600 may include three parent documents and their child documents. Specifically, cache 600 may include parent document 1 and corresponding child documents 1a, 1b, and 1c (i.e., document family 208 illustrated in FIG. 4). In addition, cache 600 may include parent document 2 and child documents 2a and 2b (i.e., document family 402 illustrated in FIG. 4). Finally, cache 600 may include parent document 3 and corresponding child documents 3a (illustrated in FIG. 4), 3b, and 3c. Cache 600 may also store any additional documents that satisfy the above conditions within database 120.

In some examples, determination module 106 may determine whether document family 208 is completely included within the search results by searching results data map 400 for every document within document family 208 identified in cache 600. Specifically, determination module 106 may search results data map 400 for documents 1, 1a, 1b, and 1c. In the example of FIG. 4, determination module 106 may determine that document family 208 is completely included within the original search results based on finding each of documents 1, 1a, 1b, and 1c within results data map 400. Additionally in this example, determination module 106 may determine that document family 402 is completely included within results data map 400 based on finding each of documents 2, 2a, and 2b within results data map 400. However, determination module 106 may determine that the document family that includes document 3a is not completely included within results data map 400. For example, determination module 106 may determine that cache 600 indicates that the document family containing document 3a also contains documents 3, 3b, and 3c, but results data map 400 only identifies document 3a as satisfying the degree of relevance. Notably, determination module 106 may conclude that the document family is not completely included within the search results based on a finding that a single member of the family is missing from the search results, without further searching for any other members of the family.

Figure 7:
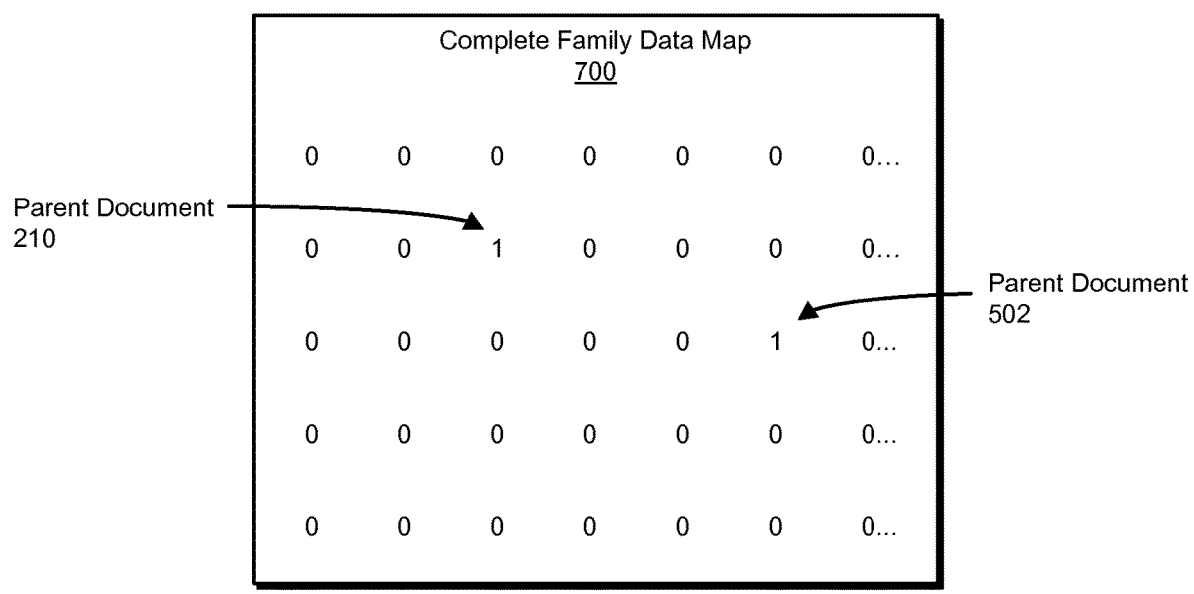
FIG. 7 is an illustration of an exemplary data map that identifies the parent document of any document family that is completely included within the results of a search query.

In order to identify each complete document family, determination module 106 may generate an additional data map that identifies a parent document for every document family that is completely included within the original search results. As an example, FIG. 7 illustrates a complete family data map 700. In this example, determination module 106 may represent parent document 210 and parent document 502 (i.e., the parent document of document family 402 in FIG. 4) within complete family data map 700. Notably, determination module 106 may not include parent document 504 (i.e., the parent document of document 3a) within complete family data map 700, as the document family of parent document 3a is not completely included within results data map 400. As such, complete family data map 700 may represent each complete document family within the search results of search query 214.

Returning to FIG. 3, at step 306 one or more of the systems described herein may, in response to determining that both the parent document and the child document satisfy the degree of relevance to content of the search query, automatically depict both the parent document and the child document in a hierarchical structure that shows the relationship between the parent document and the child document within original search results that a user interface of a computing device presents in response to the search query. For example, depiction module 108 may, as part of computing device 202 in FIG. 2, automatically depict, in response to determining that both parent document 210 and child document 212 satisfy the degree of relevance, both parent document 210 and child document 212 in a hierarchical structure within original search results that a user interface of computing device 202 presents in response to search query 214.

The systems described herein may depict both the parent document and the child document in a hierarchical structure in a variety of ways. In some examples, depiction module 108 may depict both parent document 210 and child document 212 (and any remaining documents within document family 208) in the hierarchical structure in response to identifying parent document 210 within complete family data map 700. For example, depiction module 108 may render documents that satisfy the degree of relevance within the user interface by sequentially analyzing each document family identified within parent data map 500. Specifically, depiction module 108 may search for each document identified in parent data map 500 within complete family data map 700. Depiction module 108 may then depict the documents within the document family represented by each parent document within parent data map 500 based on whether the parent document is identified within complete family data map 700.

In one example, depiction module 108 may begin rendering the search results of search query 214 by analyzing the document family associated with parent document 210 within parent data map 500. For example, depiction module 108 may determine that complete family data map 700 identifies parent document 210. Based on that determination, depiction module 108 may access information that indicates the hierarchical structure of documents within document family 208 (as previously mentioned, database 120 may store associations between parent and child documents). Using the information that indicates the hierarchical structure of document family 208, depiction module 108 may depict the entirety of document family 208 within the user interface that presents the search results of search query 214.

Figure 8:
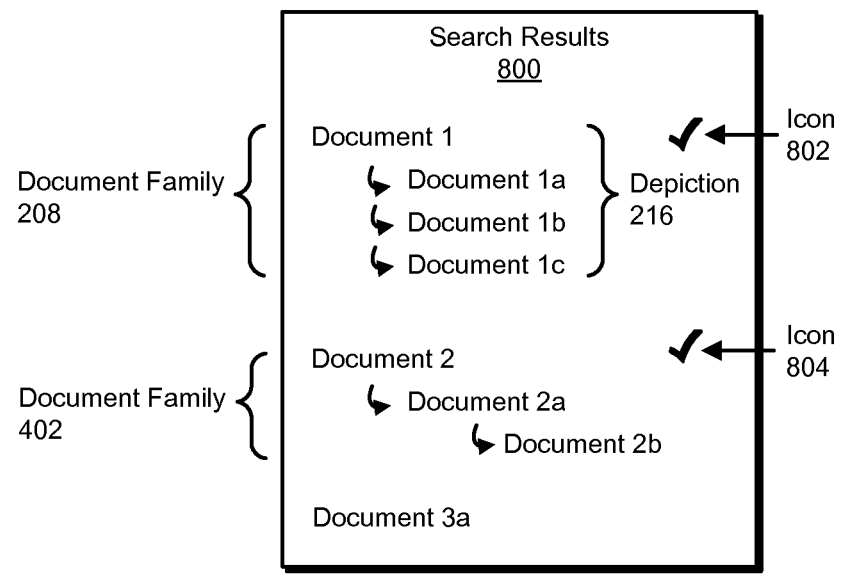
FIG. 8 is an illustration of exemplary search results that show complete document families in a hierarchical structure.

As an example, FIG. 8 illustrates search results 800. In this example, depiction module 108 may display search results 800 to a user in response to the user entering search query 214 into a search engine. As shown in FIG. 8, the hierarchical structure of document family 208 may be depicted within depiction 216 by displaying documents 1a, 1b, and 1c underneath and indented relative to document 1. Depiction module 108 may use any indent, line, arrow, graphic, icon, and/or other symbol to indicate a parent-child relationship. In addition, depiction module 108 may display an icon 802 adjacent to depiction 216 that indicates that document family 208 is complete. The term "icon," as used herein, generally refers to any image or graphical output that may designate a document, a document family, search results, and/or properties of one of these (e.g., the property of being a complete or incomplete document family).

Notably, depiction module 108 may either (1) only display documents that satisfy the degree of relevance (as in FIG. 8 and based on results data map 400, for example) or (2) automatically expand original search results to show complete, or more complete, document families that include documents that originally satisfied the degree of relevance by adding other documents that did not satisfy the degree of relevance. In case (2), depiction module 108 may limit the expansion of search results based on one or more limiting criteria (e.g., no expansion beyond a certain threshold of size or number) to ensure that the search results remain meaningful and helpful to the user without being overwhelming. Moreover, depiction module 108 may also show a hierarchical relationship by showing either (1) every parent-child relationship, included nested parent-child relationships, within a complete document family (as in FIG. 8) and/or (2) collapsing nested parent-child relationships to only show a parent document and all child, grandchild, and great-grandchild (and so on) documents as mere child documents of the parent document. Notably, depiction module 108 may use method (1) for document families that entirely satisfy the degree of relevance (as in FIG. 8) and may use method (2) for a document family that does not entirely satisfy the degree of relevance, such that only some members of the document family are shown in the search results in collapsed format (while the other members of the document family are omitted entirely from the search results). Depiction module 108 may also use any icon or graphic to mark documents as either (1) satisfying the original search request and degree of relevance and/or (2) not satisfying the original search request but added to the search results as a member of a document family that includes a document that satisfies the original search request. Depiction module 108 may also include controls in the user interface for a user to expand or collapse any level of a hierarchy (by default, all levels may be expanded).

After determining that document family 208 is completely included within the search results, depiction module 108 may determine whether the document family associated with parent document 502 within parent data map 500 is complete. In one example, depiction module 108 may determine that the document family associated with parent document 502 (i.e., document family 402 in FIG. 4) is complete by identifying parent document 502 within complete family data map 700. Depiction module 108 may then access information within database 120 that indicates the hierarchical structure of document family 402. As shown in search results 800, the hierarchical structure of document family 402 may indicate that document 2 represents the top level of the hierarchy, with document 2a descending from document 2, and document 2b descending from document 2a. Similarly to displaying icon 802 adjacent to depiction 216, depiction module 108 may display an icon 804 adjacent to the depiction of document family 402.

After determining that document family 208 is completely included within the search results, depiction module 108 may determine whether the document family associated with parent document 504 is complete (e.g., based on parent data map 500). In one example, depiction module 108 may determine that the document family associated with parent document 504 is not complete by determining that parent document 502 is not contained within complete family data map 700. In response to determining that the document family associated with parent document 504 is not complete, depiction module 108 may only display document 3a within search results 800. In addition, depiction module 108 may further indicate that the document family is incomplete by displaying an icon (e.g., an "X", as opposed to the check mark within icons 802 and 804), or by displaying no icon at all (as shown in FIG. 8). In general, depiction module 108 may condition the display of a hierarchical relationship based on whether the entire document family satisfies the degree of relevance, as discussed above.

Depiction module 108 may depict documents that satisfy the degree of relevance to content of search query 214 and/or their hierarchical structures in a variety of ways. In one example, the systems described herein may determine that document family 208 is not completely included within the original search results. In response to that determination, depiction module 108 may omit one or more members of document family 208 from depiction 216. For example, determination module 106 may determine that parent document 210 and child document 212 both satisfy the degree of relevance, but that one or more additional documents within document family 208 (e.g., documents 1b and 1c illustrated in FIG. 4) do not satisfy the degree of relevance. In this example, depiction module 108 may depict the hierarchical relationship between parent document 210 and child document 212 (but not documents 1b and 1c) by depicting child document 212 underneath and indented relative to parent document 210. Alternatively, depiction module 108 may simply depict parent document 210 and child document 212 without indicating their hierarchical relationship (e.g., by depicting child document 212 directly under parent document 210). In this way, depiction module 108 may still group the documents that satisfy the degree of relevance based on their document families, but may emphasize the presence of complete document families within the search results by only displaying the complete (non-compressed) hierarchical structure of complete families.

Notably, depiction module 108 may depict the full hierarchical structures of document family 208 and any additional document family without requiring further user input to expand the original search results. For example, depiction module 108 may automatically indicate the hierarchical structures of complete document families such that every document within the family is visible and the hierarchical relationships between the documents are immediately clear to a user that entered search query 214. In some examples, in order to increase the usability of information presented within the search results, depiction module 108 may present users an option to collapse the child documents within a document family (e.g., via checking a box adjacent to the parent document of the document family).

As described above, by determining that each member of a document family satisfies a degree of relevance to content of a search query, the disclosed systems and methods may determine whether the document family is completely included within the results of the search query. In addition, by identifying each complete document family within the results of a search query, the disclosed systems and methods may automatically depict each complete document family to a user without requiring additional input from the user. As such, the disclosed systems and methods may quickly and efficiently provide users with an intuitive, hierarchical display that clearly and accurately describes the relationships between documents within results of a search query.

Figure 9:
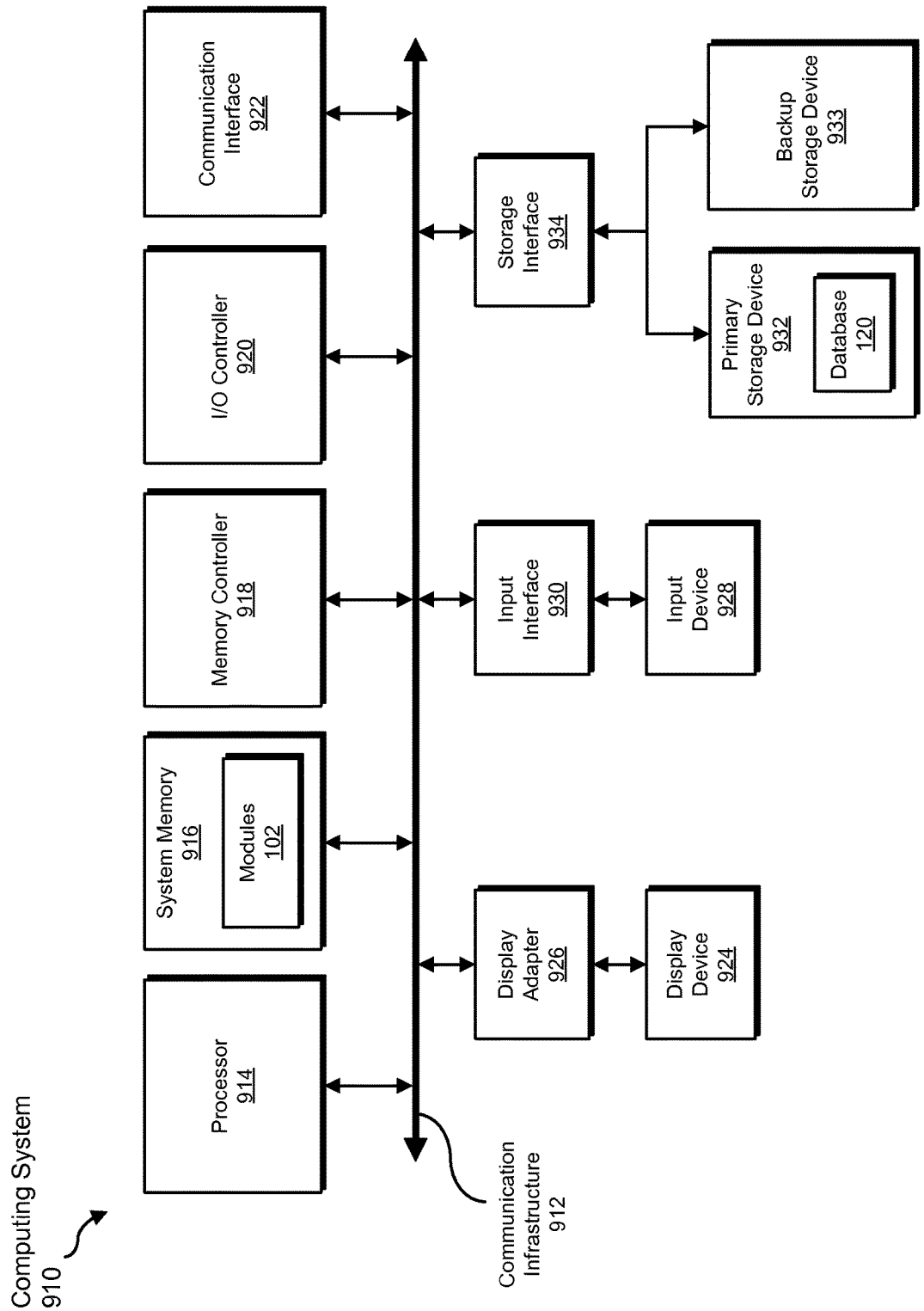
FIG. 9 is a block diagram of an exemplary computing system capable of implementing one or more of the embodiments described and/or illustrated herein.

FIG. 9 is a block diagram of an exemplary computing system 910 capable of implementing one or more of the embodiments described and/or illustrated herein. For example, all or a portion of computing system 910 may perform and/or be a means for performing, either alone or in combination with other elements, one or more of the steps described herein (such as one or more of the steps illustrated in FIG. 3). All or a portion of computing system 910 may also perform and/or be a means for performing any other steps, methods, or processes described and/or illustrated herein.

Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may include at least one processor 914 and a system memory 916.

Processor 914 generally represents any type or form of physical processing unit (e.g., a hardware-implemented central processing unit) capable of processing data or interpreting and executing instructions. In certain embodiments, processor 914 may receive instructions from a software application or module. These instructions may cause processor 914 to perform the functions of one or more of the exemplary embodiments described and/or illustrated herein.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, one or more of modules 102 from FIG. 1 may be loaded into system memory 916.

In certain embodiments, exemplary computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI Express (PCIe), or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution.

As illustrated in FIG. 9, computing system 910 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also include at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device.

As illustrated in FIG. 9, exemplary computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a solid state drive, a floppy disk drive, a magnetic tape drive, an optical disk drive, a flash drive, or the like. Storage interface 934 generally represents any type or form of interface or device for transferring data between storage devices 932 and 933 and other components of computing system 910. In one example, database 120 from FIG. 1 may be stored in primary storage device 932.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an Application Specific Integrated Circuit (ASIC) adapted to implement one or more of the exemplary embodiments disclosed herein.

Figure 10:
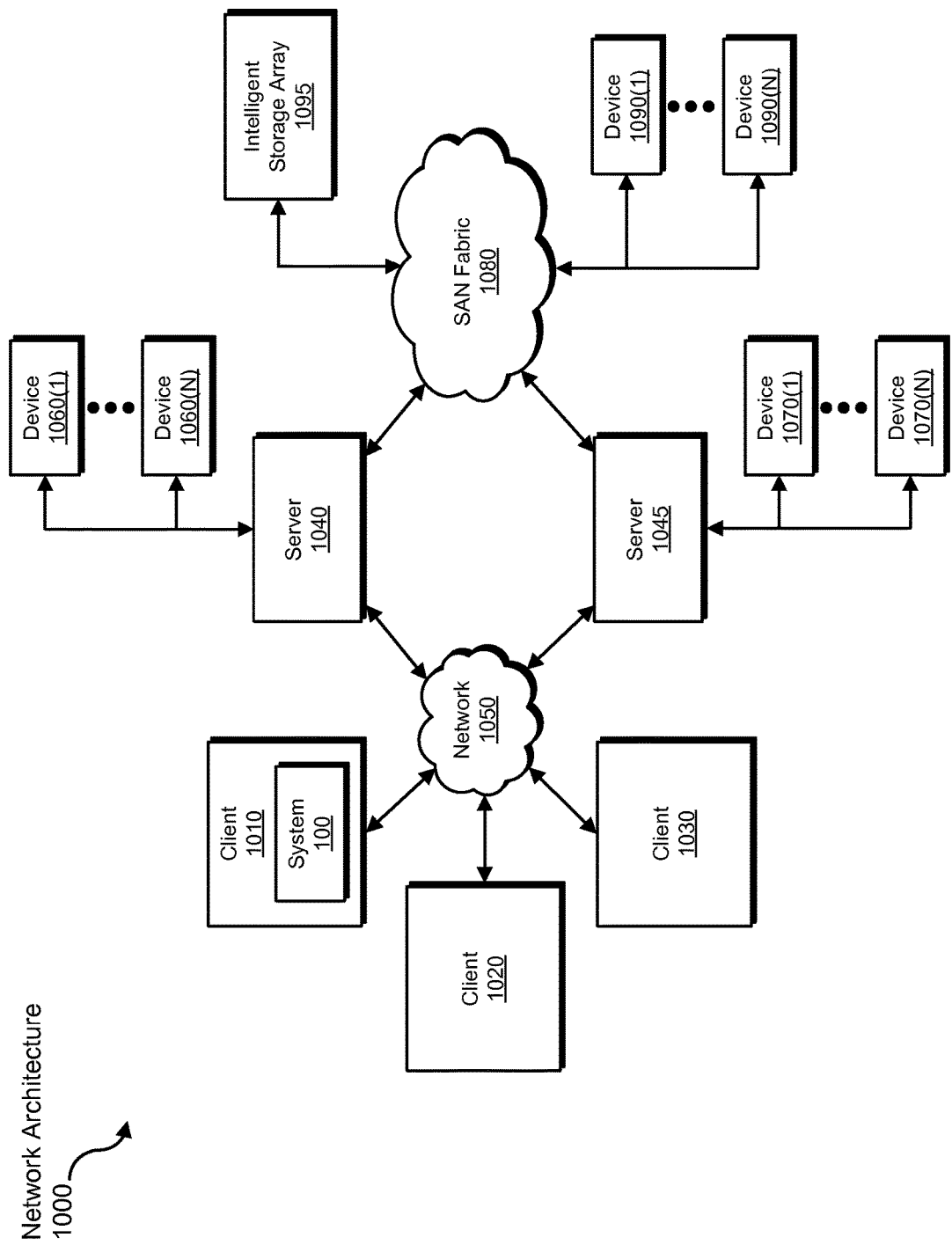
FIG. 10 is a block diagram of an exemplary computing network capable of implementing one or more of the embodiments described and/or illustrated herein.

FIG. 10 is a block diagram of an exemplary network architecture 1000 in which client systems 1010, 1020, and 1030 and servers 1040 and 1045 may be coupled to a network 1050. As detailed above, all or a portion of network architecture 1000 may perform and/or be a means for performing, either alone or in combination with other elements, one or more of the steps disclosed herein (such as one or more of the steps illustrated in FIG. 3). All or a portion of network architecture 1000 may also be used to perform and/or be a means for performing other steps and features set forth in the instant disclosure.

Client systems 1010, 1020, and 1030 generally represent any type or form of computing device or system, such as exemplary computing system 910 in FIG. 9. Similarly, servers 1040 and 1045 generally represent computing devices or systems, such as application servers or database servers, configured to provide various database services and/or run certain software applications. Network 1050 generally represents any telecommunication or computer network including, for example, an intranet, a WAN, a LAN, a PAN, or the Internet. In one example, client systems 1010, 1020, and/or 1030 and/or servers 1040 and/or 1045 may include all or a portion of system 100 from FIG. 1.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent Network-Attached Storage (NAS) devices configured to communicate with servers 1040 and 1045 using various protocols, such as Network File System (NFS), Server Message Block (SMB), or Common Internet File System (CIFS).

Servers 1040 and 1045 may also be connected to a Storage Area Network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050.

As detailed above, computing system 910 and/or one or more components of network architecture 1000 may perform and/or be a means for performing, either alone or in combination with other elements, one or more steps of an exemplary method for displaying search results.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a request to perform a document search, transform the request, output a result of the transformation to a storage or output device (e.g., a display), use the result of the transformation to display search results, and store the result of the transformation to a memory or storage. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for displaying search results, at least a portion of the method being performed by a computing device comprising at least one processor, the method comprising:
   receiving, at a document database that stores a plurality of electronic text-based files including a document family comprising a parent document and at least one child document that depends from the parent document, a search query that includes at least one keyword;
   determining that text of every document within the document family satisfies a degree of relevance to the keyword of the search query by:
      generating a parent data map that identifies a parent document of each document family within the document database that comprises at least one document that satisfies the degree of relevance;
      generating a family data map that identifies a complete document family for each parent document identified in the parent data map;
      comparing the documents identified in the family data map with a results data map that identifies each document within the document database that satisfies the degree of relevance; and
      determining, based on the comparison, that each document within the document family is included within the results data map;
   in response to determining that every document within the document family satisfies the degree of relevance, improving the usefulness of search results displayed to a user by automatically including, within original search results that a user interface of the computing device presents in response to the search query, a hierarchical structure that shows relationships between the parent document and each child document within the document family;
   identifying an additional document family that is partially but not completely included within the original search results based on determining that:
      at least one document within the additional document family satisfies the degree of relevance; and
      not every document within the additional document family satisfies the degree of relevance;
   simultaneously displaying, to the user as part of the original search results, the hierarchical structure and an additional hierarchical structure that shows relationships between documents within the additional document family despite the document family and the additional document family having different degrees of relevance to the search query;
   indicating, to the user, that the document family and the additional document family have the different degrees of relevance to the search query by:
      depicting, adjacent to the hierarchical structure, an icon indicating that the document family is completely included within the original search results; and
      depicting, adjacent to the additional hierarchical structure, an additional icon that:
         indicates that the additional document family is not completely included within the original search results; and
         is visually distinct from the icon indicating the document family is completely included within the original search results.

2. The method of claim 1, wherein generating the parent data map comprises performing the following function for each document that satisfies the degree of relevance:
   determining whether to add the document to the parent data map based on determining whether the document database identifies the document as a parent document; and
   adding any parent document of the document to the parent data map.

3. The method of claim 2, wherein generating the family data map comprises referencing a cache that maps parent documents to child documents to identify each child document of every parent document identified in the parent data map.

4. The method of claim 1, further comprising generating a data map that identifies a parent document for every document family that is completely included within the original search results.

5. The method of claim 1, further comprising omitting, based on determining that not every document within the additional document family satisfies the degree of relevance, a member of the additional document family from the additional hierarchical structure.

6. The method of claim 1, wherein showing the relationships between the parent document and each child document within the document family is performed in response to the search query without requiring further user input to expand the original search results.

7. A system for displaying search results, the system comprising:
   a reception module, stored in memory, that receives, at a document database that stores a plurality of electronic text-based documents including a document family comprising a parent document and at least one child document that depends from the parent document, a search query that includes at least one keyword;
   a determination module, stored in memory, that:
      determines that text of every document within the document family satisfies a degree of relevance to the keyword of the search query by:
         generating a parent data map that identifies a parent document of each document family within the document database that comprises at least one document that satisfies the degree of relevance;

generating a family data map that identifies a complete document family for each parent document identified in the parent data map;

comparing the documents identified in the family data map with a results data map that identifies each document within the document database that satisfies the degree of relevance; and determining, based on the comparison, that each document within the document family is included within the results data map; and identifies an additional document family that is partially but not completely included within original search results of the search query based on determining that:

at least one document within the additional document family satisfies the degree of relevance; and not every document within the additional document family satisfies the degree of relevance;

a depiction module, stored in memory, that:

in response to the determination that every document within the document family satisfies the degree of relevance, improves the usefulness of search results displayed to a user by automatically including, within a user interface of a computing device that presents the original search results in response to the search query, a hierarchical structure that shows relationships between the parent document and each child document within the document family;

simultaneously displays, to the user as part of the original search results, the hierarchical structure and an additional hierarchical structure that shows relationships between documents within the additional document family despite the document family and the additional document family having different degrees of relevance to the search query;

indicates, to the user, that the document family and the additional document family have the different degrees of relevance to the search query by:

depicting, adjacent to the hierarchical structure, an icon indicating that the document family is completely included within the original search results;

depicting adjacent to the additional hierarchical structure, an additional icon that:

indicates that the additional document family is not completely included within the original search results; and is visually distinct from the icon indicating the document family is completely included within the original search results; and at least one processor that executes the reception module, the determination module, and the depiction module.

8. The system of claim 7, wherein the determination module generates the parent data map by performing the following function for each document that satisfies the degree of relevance:

determining whether to add the document to the parent data map based on determining whether the document database identifies the document as a parent document; and adding any parent document of the document to the parent data map.

9. The system of claim 8, wherein the determination module generates the family data map by referencing a cache that maps parent documents to child documents to identify each child document of every parent document identified in the parent data map.

10. The system of claim 7, wherein the determination module further generates a data map that identifies a parent document for every document family that is completely included within the original search results.

11. The system of claim 7, wherein the depiction module omits, based on the determination that not every document within the additional document family satisfies the degree of relevance, a member of the additional document family from the additional hierarchical structure.

12. A non-transitory computer-readable medium comprising one or more computer-executable instructions that, when executed by at least one processor of a computing device, cause the computing device to:

receive, at a document database that stores a plurality of electronic text-based files including a document family comprising a parent document and at least one child document that depends from the parent document, a search query that includes at least one keyword;

determine that text of every document within the document family satisfies a degree of relevance to the keyword of the search query by:

generating a parent data map that identifies a parent document of each document family within the document database that comprises at least one document that satisfies the degree of relevance;

generating a family data map that identifies a complete document family for each parent document identified in the parent data map;

comparing the documents identified in the family data map with a results data map that identifies each document within the document database that satisfies the degree of relevance; and determining, based on the comparison, that each document within the document family is included within the results data map;

in response to determining that every document within the document family satisfies the degree of relevance, improve the usefulness of search results displayed to a user by automatically including, within original search results that a user interface of the computing device presents in response to the search query, a hierarchical structure that shows relationships between the parent document and each child document within the document family;

identify an additional document family that is partially but not completely included within the original search results based on determining that:

at least one document within the additional document family satisfies the degree of relevance; and not every document within the additional document family satisfies the degree of relevance;

simultaneously display, to the user as part of the original search results, the hierarchical structure and an additional hierarchical structure that shows relationships between documents within the additional document family despite the document family and the additional document family having different degrees of relevance to the search query;

indicate, to the user, that the document family and the additional document family have the different degrees of relevance to the search query by:

depicting, adjacent to the hierarchical structure, an icon indicating that the document family is completely included within the original search results; and depicting, adjacent to the additional hierarchical structure, an additional icon that:
  indicates that the additional document family is not completely included within the original search results; and
  is visually distinct from the icon indicating the document family is completely included within the original search results.

13. The method of claim 1, further comprising providing, within the user interface, a control that enables the user to collapse at least one level of the hierarchical structure such that documents within the level are hidden from the-view of the user.

14. The system of claim 7, wherein the depiction module further provides, within the user interface, a control that enables the user to collapse at least one level of the hierarchical structure such that documents within the level are hidden from view of the user.

15. The method of claim 2, wherein generating the parent data map comprises:
  generating a bitmap that stores a plurality of bits capable of being switched between a logical low value and a logical high value; and
  associating each bit within the bitmap with one document within the document database.

16. The method of claim 15, wherein adding any parent document of the document to the parent data map comprises:
  identifying, within the bitmap, a bit associated with a parent document to be added to the parent data map; and
  setting the bit associated with the parent document to the logical high value.

17. The method of claim 16, further comprising:
  setting at least a portion of the bits associated with child documents within the document database to the logical low value; and
  setting at least a portion of the bits associated with parent documents within the document database that are not to be added to the parent data map to the logical low value.

* * * * *

UNITED STATES PATENT AND TRADEMARK OFFICE
CERTIFICATE OF CORRECTION

PATENT NO. : 10,776,376 B1  
APPLICATION NO. : 14/562038  
DATED : September 15, 2020  
INVENTOR(S) : Michael Coyle et al.

Page 1 of 1

It is certified that error appears in the above-identified patent and that said Letters Patent is hereby corrected as shown below:

In the Claims

In Column 25, Claim 13, Line 12, after "from" delete "the-".

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*